US011755267B1

(12) United States Patent
Morales

(10) Patent No.: US 11,755,267 B1
(45) Date of Patent: Sep. 12, 2023

(54) METHODS AND PRINTING SYSTEM USING HYBRID CONSUMABLE USE ESTIMATION IN PRINTING OPERATIONS

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 17/719,877

(22) Filed: Apr. 13, 2022

(51) Int. Cl.
*G06F 3/12* (2006.01)

(52) U.S. Cl.
CPC .......... *G06F 3/1253* (2013.01); *G06F 3/1203* (2013.01); *G06F 3/126* (2013.01); *G06F 3/1267* (2013.01); *G06F 3/1272* (2013.01); *G06F 3/1288* (2013.01)

(58) Field of Classification Search
None
See application file for complete search history.

(56) References Cited

U.S. PATENT DOCUMENTS

| | | | | |
|---|---|---|---|---|
| 2002/0076245 | A1* | 6/2002 | Aiyama | G06K 15/1823 400/61 |
| 2010/0053673 | A1* | 3/2010 | Oba | G03G 21/02 358/1.15 |
| 2010/0153145 | A1* | 6/2010 | Klassen | G03G 15/5016 707/E17.023 |
| 2012/0236342 | A1* | 9/2012 | Price | G06F 3/1211 358/1.15 |
| 2014/0233055 | A1* | 8/2014 | Eizenberg | G06F 3/1244 358/1.15 |
| 2019/0268482 | A1* | 8/2019 | Stanich | H04N 1/00005 |
| 2021/0271943 | A1* | 9/2021 | Stanich | G06K 15/027 |
| 2022/0137903 | A1* | 5/2022 | Morales | G06F 3/1219 358/1.2 |
| 2022/0391649 | A1* | 12/2022 | Worrall | G06K 15/1823 |

\* cited by examiner

*Primary Examiner* — Henok Shiferaw
(74) *Attorney, Agent, or Firm* — MILLEN, WHITE, ZELANO & BRANIGAN, P.C.; William F. Nixon

(57) ABSTRACT

A printing system provides consumable use estimation for print jobs using an estimation system and the digital front end (DFE) of a printing device. A hybrid consumable use estimation process is enabled that minimizes impact to the production printing at the printing device. The DFE of the printing device generates a consumable use estimate using an estimate job queue and raster image processor (RIP) separate from the normal job queues. The estimate job queue does not generate print data. Using the rendered data, the DFE generates the consumable use estimate and returns it to the estimation system. The printing device then prints the document for the print job and provides the actual consumable use to the estimation system for monitoring and tracking of consumable use. In some instances, the estimation system performs the consumable use estimation when a condition exists at the DFE at the printing device.

18 Claims, 8 Drawing Sheets

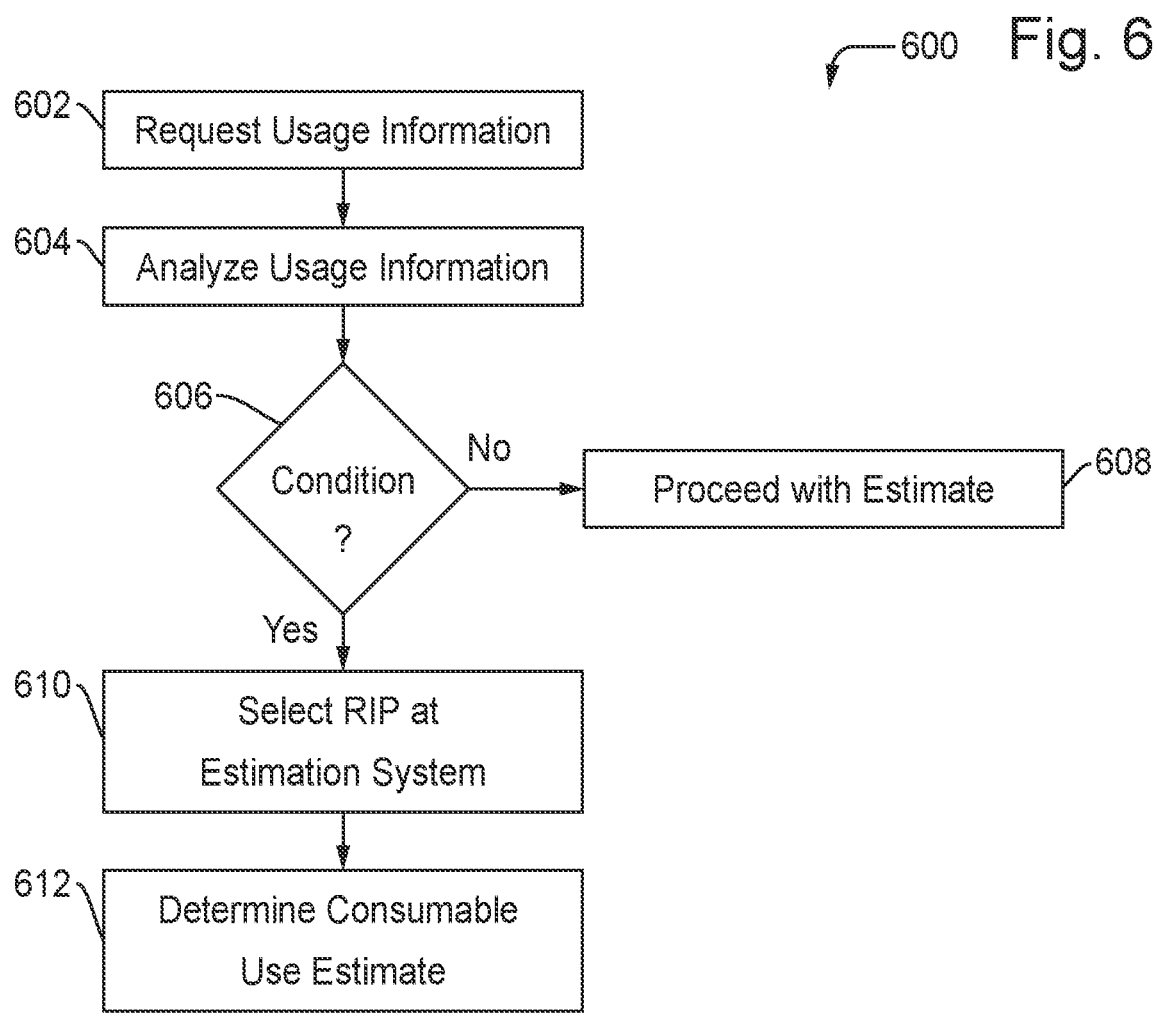

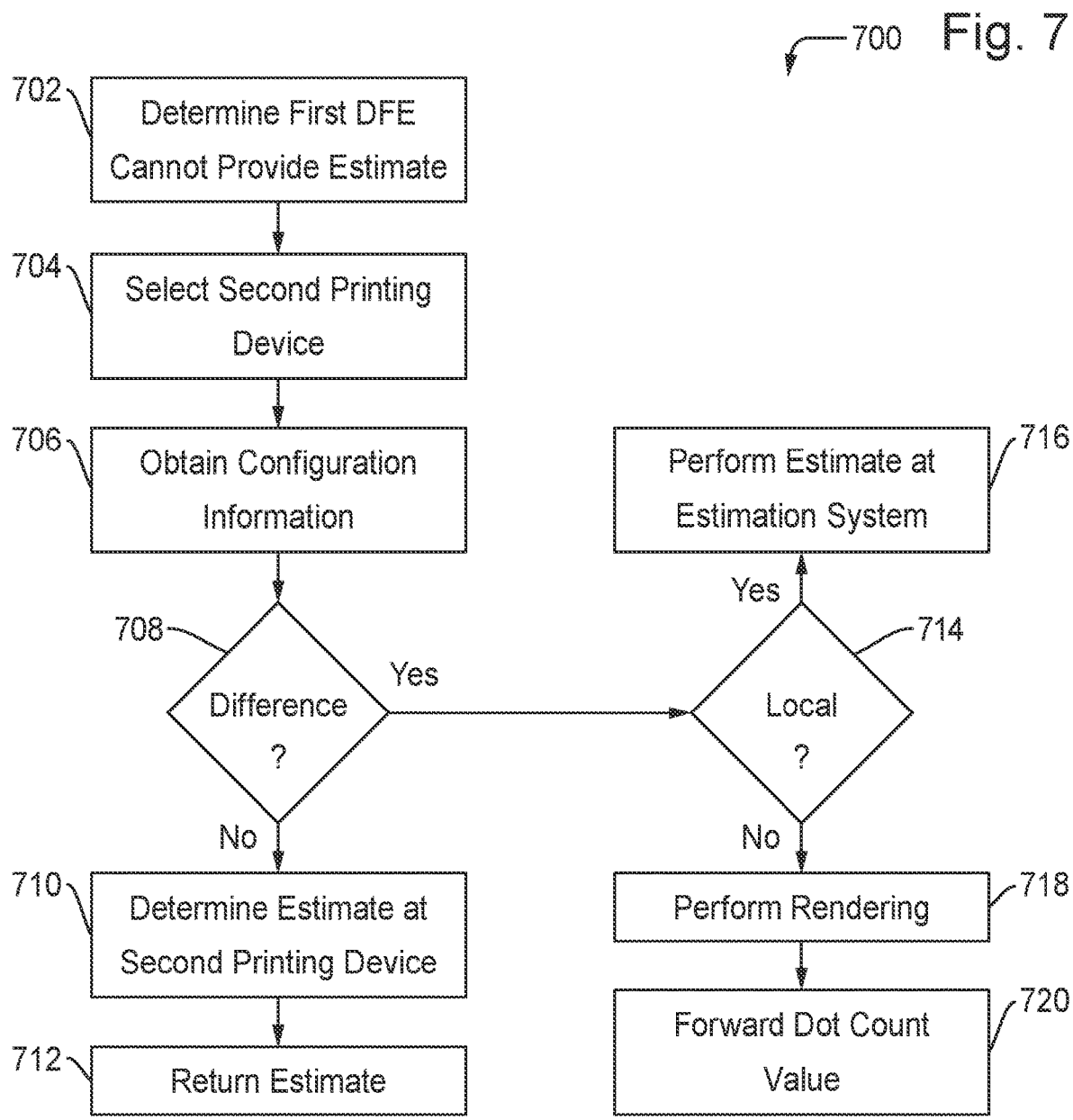

METHODS AND PRINTING SYSTEM USING HYBRID CONSUMABLE USE ESTIMATION IN PRINTING OPERATIONS

FIELD OF THE INVENTION

The present invention relates to a printing system and associated methods to estimate consumable use in printing operations using hybrid consumable estimation by implementing a separate queue at the printing device.

DESCRIPTION OF THE RELATED ART

Consumables for print jobs include ink use or toner use. Estimates for the amount of ink or toner to be used to process a print job is of interest to customers and print shops. Consumable estimation systems may be most accurate when they can use the same raster image processor (RIP) that will be used to process a print job. In addition, these systems may, in some cases, comprehend printing device configuration and adjust consumable use estimation settings based on that knowledge. The downside for these settings are that they take digital front end (DFE) resources and press operator time away from producing print jobs that pay money. Further, these estimation systems delay job quoting because they require press operator time, which may not be readily available.

Other consumable use estimation systems may be offline in a stand alone application. These systems are less accurate as they generally provide generic consumable use estimation based on color conversion, which may or may not match the conversion performed in the actual RIP. These offline systems cannot consider printing device configuration, including calibration, which may impact consumable use. The offline systems, however, do not take away time from production services. Further, an offline estimation system may be accessible to customer service representatives to eliminate any delay in generating print job quotes.

SUMMARY OF THE INVENTION

A method for hybrid consumable use estimation is disclosed. The method includes receiving a print job at a server for a consumable use estimation. The method also includes sending the print job to a digital front end (DFE) of a printing device. The method also includes determining a consumable use estimate for the print job at the DFE using the settings of the printing device. The DFE implements a separate queue to provide the estimated consumable use for the print job. The method also includes returning the consumable use estimate for the print job to the server.

A method for hybrid consumable use estimation is disclosed. The method includes receiving a print job at a server for a consumable use estimation. The method also includes sending the print job to a digital front end (DFE) of a printing device to obtain a consumable use estimate. The method also includes determining that the DFE cannot provide the consumable use estimate. The method also includes determining the consumable use estimate using a raster image processor (RIP) at the server. The DFE provides settings for the printing device to the server.

A method for hybrid consumable use estimation is disclosed. The method includes receiving a print job at a server for a consumable use estimation. The method also includes sending the print job to a first digital front end (DFE) of a first printing device to obtain a consumable use estimate. The method also includes determining that the first DFE cannot provide the consumable use estimate. The method also includes sending the print job to a second DFE of a second printing device to obtain the consumable use estimate. The method also includes determining the consumable use estimate for the print job at the second DFE of the second printing device. The method also includes returning the consumable use estimate for the print job to the server.

A method for hybrid consumable use estimation is disclosed. The method includes receiving a print job at a server for a consumable use estimation. The method also includes sending the print job to a digital front end (DFE) of a printing device. The method also includes determining a consumable use estimate for the print job at the DFE using the settings of the printing device. The DFE configures a raster image processor (RIP) instance based on a print ticket setting. The method also includes returning the consumable use estimate for the print job to the server.

BRIEF DESCRIPTION OF THE DRAWINGS

Various other features and attendant advantages of the present invention will be more fully appreciated when considered in conjunction with the accompanying drawings.

FIG. 6 illustrates a flowchart for determining whether to estimate consumable use at the estimation system according to the disclosed embodiments.

FIG. 7 illustrates a flowchart for determining whether to estimate consumable use at a secondary printing device according to the disclosed embodiments.

DETAILED DESCRIPTION OF THE PREFERRED EMBODIMENTS

Figure 1A:
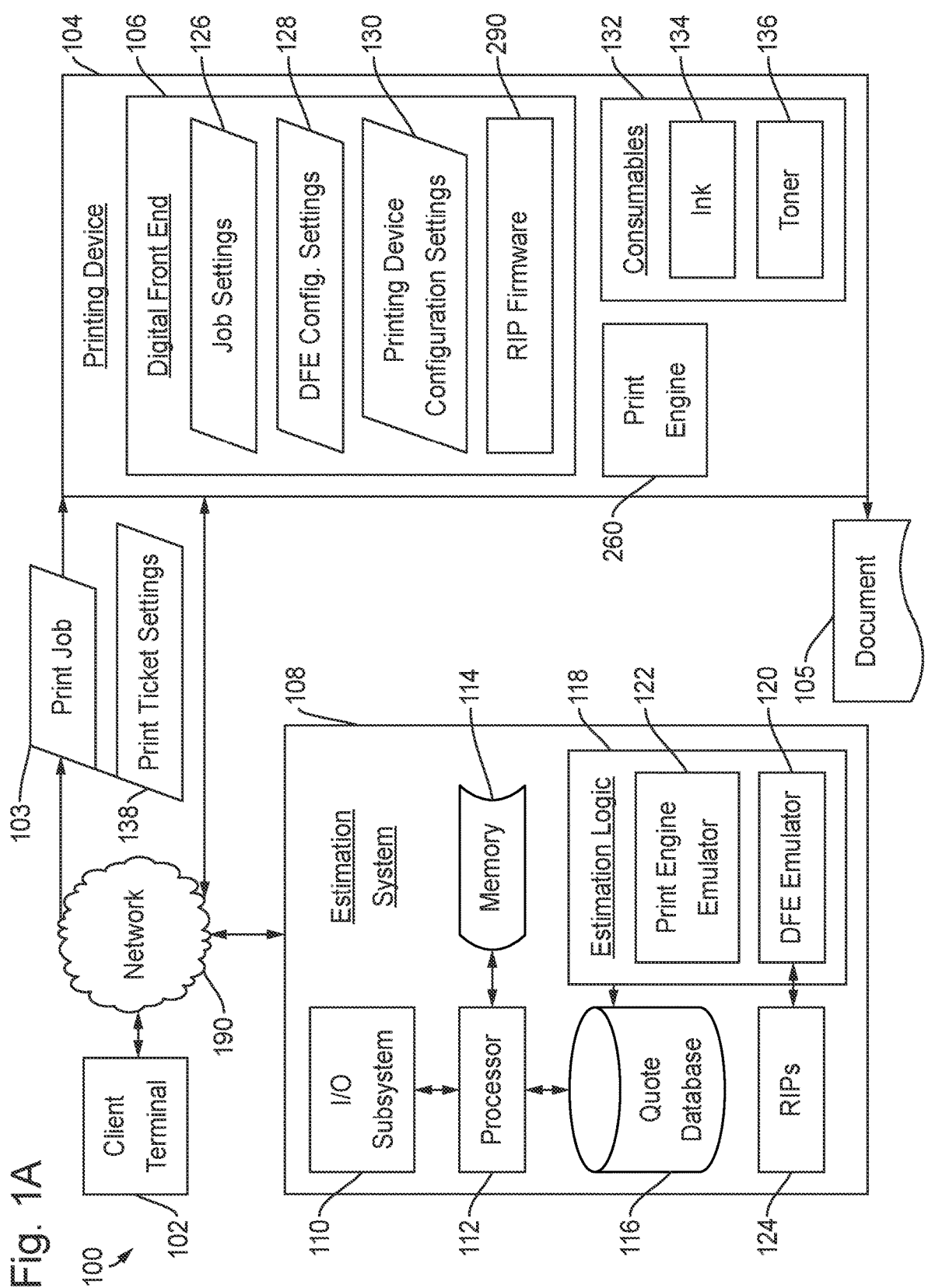
FIG. 1A illustrates a printing system for printing documents according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments provide for a hybrid consumable estimation system that incorporates the benefits of both inline and offline consumable use estimation. As disclosed below, consumable use may include ink use for the appropriate printing devices. It also may include toner use for the appropriate printing devices. Other consumables may be estimated and considered according to the disclosed embodiments, such as paper, media, impressions, and the like. In some instances, "ink use" may be recited, which also may refer to toner use for printing operations.

The disclosed system includes a DFE component that includes consumable use estimation functionality, as is commonly available in printing devices. Unlike existing products, the disclosed DFE will be enhanced by the following features. Any client may submit a print job for estimation, as opposed to requiring an operator to select the print job and request an estimate. The DFE will return consumable use estimation functionality for the submitted print job. The DFE also retrieves project names from a server component. The DFE also may create new projects in the server component.

The DFE also includes the ability to associate print jobs with existing projects in the server component. The existing projects may be long term projects. The DFE also may return consumable use data to the server component for monitoring and tracking. These features allow the DFE to create estimation projects in the server component. This ability eliminates usability issues related to estimating consumable use for print jobs that are automatically submitted from upstream systems to the DFE. When an automated submission is used, the first time that the operator sees a print job is when it appears in the DFE. Offline consumable use estimation requires that users export job files from the DFE and submit them to an offline system for estimation.

Jobs submitted for consumable use estimation are processed in a separate queue that is different than normal job processing queues. Specifically, these queues never generate print data. These queues only rasterize then delete print jobs. These queues are configured to minimize impact on the rest of the printing device. Print jobs submitted to these queues have a lower priority than other print jobs. Consumable use estimation jobs will pause raster image processing if other print jobs are submitted to the printing device. Further, print jobs submitted to these queues are processed serially using a single RIP instance as opposed to parallel processing for other print jobs. A RIP associated with these queues is configured to use less resources versus standard RIPs being used in the DFE.

The disclosed system also includes a server component. The server component allows any operator to submit print jobs for consumable use estimation. When a print job is submitted, the server component sends the print job to the DFE for estimation. Once the print job is completed, the server component receives consumable use information from the DFE. This information may be provided to the operator. The server component also allows operators to create estimation projects that will be used for initial estimations and for monitoring the actual costs from print runs.

The server component also includes a full RIP so that it can perform complete consumable use estimation. This RIP component, however, only is used conditionally. When a consumable use calculation is initiated within the server component, the print job is nominally sent to the DFE for estimation. The server component, however, performs the consumable use estimation locally if the printing device is using an embedded controller, which exhibits limited performance. The server component also may perform the consumable use estimation locally if the backlog of print jobs that need to be processed at the DFE exceeds a configured threshold.

Further, if the server component is connected to multiple printing devices, the disclosed system may elect to send print jobs for consumable use estimation to a printing device that differs from the printing device selected by the operator. This feature may be implemented when the selected printing device is not available due to the reasons disclosed above. In this case, the server component will compare the configuration for the printing device that was selected by the operator as opposed to the printing device that will actually be used for consumable use estimation. If there is a difference in the configuration between the printing devices, then the server component may elect to do the processing locally. Alternatively, instead of requesting consumable use estimation, the server component may request that the DFE only perform rendering and dot count. The server component will then take the dot count data and adjust it to determine the consumable use estimate for the selected printing device.

Thus, the disclosed embodiments provide a hybrid consumable use implementation that enables a printing system to minimize impact to production through a unique configuration at the DFB of the printing device. The disclosed embodiments also make consumable use estimation available to customer service representatives and operators/users other than the press operator. They also provide highly accurate ink and toner use estimations. The disclosed embodiments also provide long term monitoring for recurring print jobs.

FIG. 1A depicts a printing system 100 for printing documents using printing device 104 according to the disclosed embodiments. Printing system 100 may be located in a print shop or other environment suitable for production printing operations. Printing system 100 includes one or more printing devices 104 that receive print jobs from one or more client terminals 102.

Printing device 104 receives print jobs through printing system 100. It may receive print job 103. After processing print job 103, printing device 104 prints or produces document 105 in a paper or media specified by the print job. Printing device 104 is disclosed in greater detail in FIG. 2. Printing device 104 also includes digital front end (DFE) 106, which facilitates processing print job 103. DFE 106 may be disclosed in greater detail in FIG. 1B. In addition to the components of DFE 106 disclosed in FIG. 1B, it also includes various settings that may be of use for ink use estimation. This information includes job settings 126, DFE configuration settings 128, and printing device configuration settings 130. DFE 106 also includes RIP firmware 290, disclosed in greater detail below.

Printing device 104 also includes consumables 132. Consumables 132 may relate to items at or within printing device 104 but are not actually part of the printing device itself. Consumables 132, however, are used in printing operations. Consumables 132 include ink 134 and toner 136. Ink 134 and toner 136 further may be broken into different colorant inks. For example, ink 134 may include cyan ink, magenta ink, yellow ink, and black ink. If printing device 104 is not capable of color printing, then ink 134 may include only black ink. Printing device 104 may include other consumables 132, such as sheets, that are not disclosed in detail herein.

Print job 103, when printed on printing device 104, uses an amount of consumables 132 to produce document 105. In some embodiments, print job 103 produces thousands or more of a document. Thus, the amount of consumables used for print job 103 may be considerable. As disclosed above, printing system 100 may need to provide an estimate for the use of consumable 132. The estimate determined for print job 103 may depend on various settings of printing device 104. The settings as well as print ticket settings 138 associated with print job 103 impact the amount of consumables 132 used to generate document 105.

For example, DFE 106 may use RIP firmware 290 to convert bitmap images, vector graphics, fonts, and the like associated with pages in print job 103 to bitmap/rasterized representations of the pages, such as C, M, Y, and K pixels. The sum of the values of pixels of a particular color in the rasterized pages can be proportional to the amount of consumables 132 used by printing device 104 to print that color. RIP firmware 290 may rasterize pages of print job 103 according to various image rasterization settings, as captured by DFE configuration settings 128. For example, these image rasterization parameters may include calibration curves, paper definitions, ICC profiles, spot color definitions, TRCs, color conversion settings, colorant limits for ink or toner, rendering intent, K preservation, CGR level, max colorant densities, print margins, halftones, and the like.

Print engine 260 also is included with printing device 104. Printing device 104 may correspond to an industrial printing device capable of printing thousands of pages in an hour. Printing device 104 may be ink-based, toner-based, or both. Print engine 260 may include various parameters, shown as printing device configuration settings 130, that can control the operation of printing device 104, which impacts the amount of consumables 132 required by the printing device. For example, these settings may include printing device maintenance settings that control or effect head cleaning intervals, head clogging prevention intervals, and the like of printing device 104. Printing device configuration settings 130 also may include spitting, or printing spray pattern over all content, the printing of purge sheets, the printing of spit lines, or lines printed between page frames in a roll-fed printing device to ensure that all jets of the print head fire when instructed.

To lower printing device consumable usage, RIP firmware 290 may be configured via image rasterization parameters of DFE configuration settings 128 to reduce the density for each colorant, convert color images to black and white, and adjust tone reproduction curves (TRCs) to lower printing device use of consumables 132. Gray component replacement levels may be adjusted via DFE configuration settings 128.

The disclosed embodiments also include an estimation system 108 that includes estimation logic to facilitate performance of ink use estimation. Estimation system 108 may include estimation logic 118 having a DFE emulator 120 and a print engine emulator 122 configured to emulate operations performed by DFE 106 and print engine 260 of printing device 104. Print engine 260 is disclosed in greater detail below. DFE emulator 120 and print engine emulator 122 may be configured with job settings 126, DFE configuration settings 128, and printing device configuration settings 130 to match settings associated with printing device 104. Estimation logic 118 also may be configured to estimate the amount of consumables 132 to process print job 103 and produce document 105.

In operation, estimation logic 118 may monitor information and settings of printing device 104 to determine any differences from previous estimates. This feature facilitates real-time configuration information for DFE 106, RIP firmware 290, or print engine 260 with the corresponding settings utilized by printing device 104.

Estimation system 108 may be any device within system 100 and connected to network 190 to receive and send data to printing device 104. Estimation system 108 also may be connected to other printing devices within system 100. Preferably, estimation system 108 is a server. It also may be another device, such as a computer. Estimation system 108 includes a memory 114 and a processor 112. Estimation system 108 also includes an input/output (I/O) subsystem 110 and a quote database 116.

Estimation system 108 also may refer to consumable estimation software that executes on a device. As disclosed below, "offline estimation device" may refer to this software. The term "offline" may refer to the fact that estimation system 108 is not part of printing device 104, or an "inline" component of the printing process.

Processor 112 is in communication with memory 114. Processor 112 is configured to execute instruction code in memory 114. The instruction code controls offline estimation device 108 to perform various operations for estimating consumables 132 that may be used by printing device 104. Processor 112 may be a computer processing unit that executes the instruction code in memory 114.

I/O subsystem 110 may include one or more input, output, or input/output interfaces that are configured to facilitate communications with other devices within system 100, such as client terminal 102 and printing device 104. An example of I/O subsystem 110 may be configured to dynamically determine the communication methodology utilized by entities of system 100 to communication information thereto. For example, I/O subsystem 110 may determine that a first entity utilizes a RESTful API and can, as a result, communicate with the entity using an interface that uses a RESTful communication methodology.

Estimation logic 118 is implemented within offline estimation device 108 to estimate the amount of consumables 132 to be used by printing device 104 for printing document 105 of print job 103. Estimation logic 118 includes DFE emulator 120 and print engine emulator 122, as disclosed above. DFE emulator 120 and print engine emulator 122 are configured with configuration setting information to match the settings and parameters of printing device 104.

DFE emulator 120 may be configured to emulate operations performed by DFE 106 of printing device 104. The emulation depends on various settings specified for printing device 104. For example, DFE emulator 120 may be configured to convert bitmap images, vector graphics, fonts, and the like specified in sample pages of print job 103 to bitmap/rasterized representations of the pages using C, M, Y, and K pixels. The manner in which DFE emulator 120 performs the conversion may depend on various image rasterization settings of the DFE emulator, which correspond to the image rasterization settings of DFE 106.

In some embodiments, DFE emulator 120 retrieves a RIP of the plurality of RIPs 124 available at estimation system 108. Selection of the appropriate RIP provides a better basis to estimate ink use. For example, estimation logic 118 may determine the DFE software version for DFE 106 to select a RIP that has the same version. Estimation system 108 includes many different RIPs 124. Preferably, it includes one for each software version that has been released. DFE emulator 120 may automatically configure the selected RIP using configuration settings from information retrieved from DFE 106.

Print engine emulator 122 may be configured to emulate operations performed by print engine 260 or printing device 104. The emulation may depend on various printing device configuration settings 130 for printing device 104.

Estimates provided using estimation logic 118 of estimation system 108 may be stored as a record or entry in quote database 116. Each entry to quote database 116 may specify aspects associated with an estimate provided to a customer for processing a particular print job 103. Each entry may include field for job settings 126, DFE configuration settings 128, and printing device configuration settings 130 used to provide the estimate as well as a consumables estimate field and a cost field. Other information may be provided such as a client information field, a job information field, or a unique identification (ID) field. Preferably, print job 103 is a recurring printing operation in that multiple instances will occur that involves the printing of document 105.

Figure 1B:
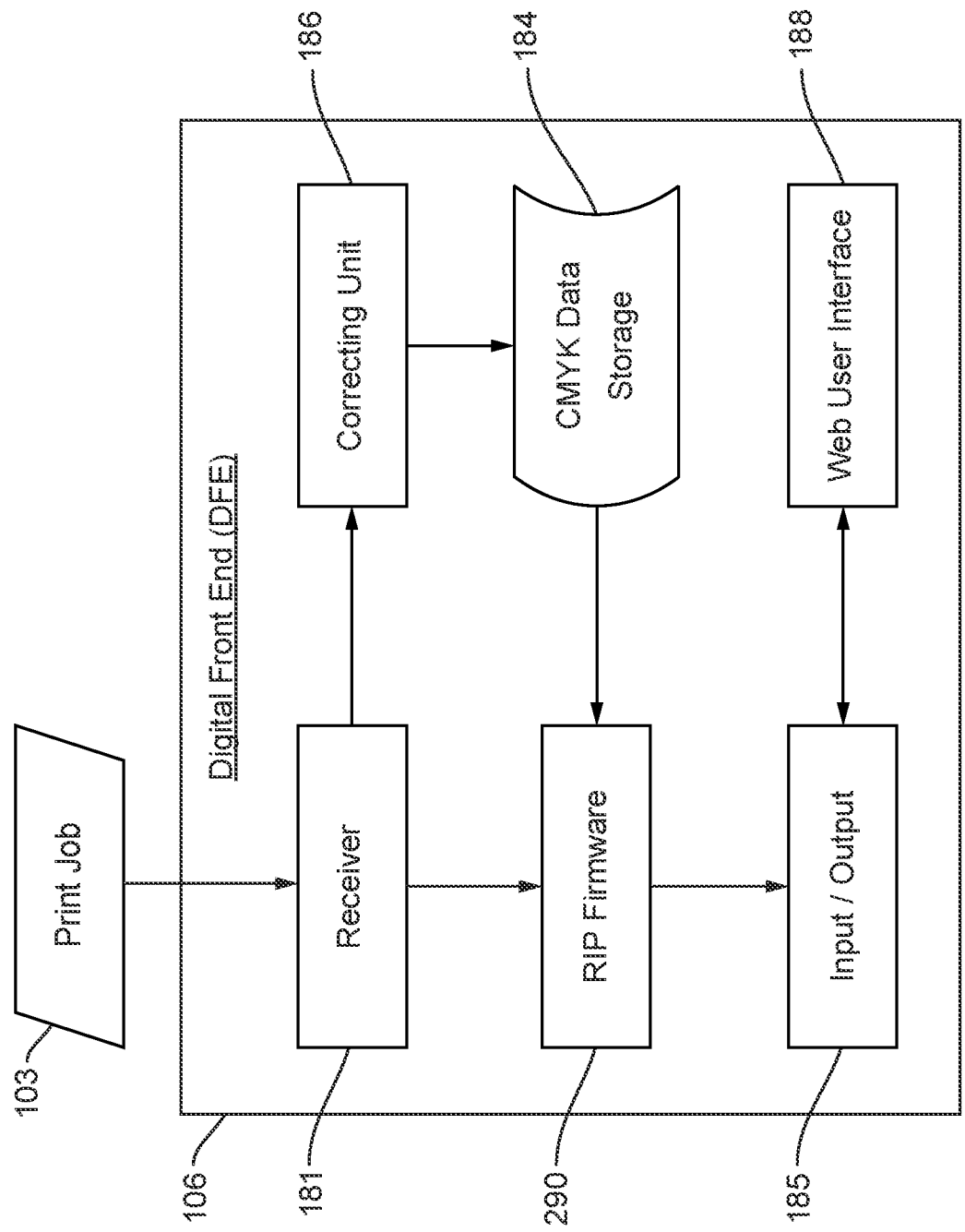
FIG. 1B illustrates a digital front end (DFE) for a printing device according to the disclosed embodiments.

FIG. 1B depicts a block diagram of DFE 106 according to the disclosed embodiments. DFE 106 includes a receiver 181, an RIP firmware 290, a CMYK data storage 184, an input/output connector 185, and a correcting unit 186. RIP firmware 290 also is disclosed in FIG. 2 and in greater detail in FIG. 3. Additional components within DFE 106 may be implemented, including those disclosed in FIG. 1A. DFE 106, therefore, includes data for job settings 126, DFE configuration settings 128, and, optionally, printing device configuration settings 130, even though these are not shown in FIG. 1B.

Receiver 181 receives print job 103 received within system 100 and outputs the print job to RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

RIP firmware 290 converts image data associated with the print job into raster data to thereby generate rendering data, and outputs the generated rendering data. RIP firmware 290 also converts the rendering data into rendering data in a CMYK format. When the rendering data is originally in the CMYK format, or CMYK rendering data, the conversion may not be performed. RIP firmware 290 may perform gradation conversion of the CMYK rendering data, with reference to one or more tone reproduction curves (TRCs). A TRC refers to data indicating the relationship between a colored gradation value for rendering data and print color, or print density, on a given print medium.

When print color provided by printing device 104 alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

The rendering data generated by RIP firmware 290 is transmitted within printing device 104 via input/output connector 185. The print condition information and the print medium type, as well as the rendering data, may be transmitted to engine 260 found in printing device 104 disclosed in FIG. 2.

DFE 106 also includes web user interface 188 that may communicate with other printing devices or estimation system 108, if it is located at a separate device, using, for example, input/output connector 185. Web user interface 188, or web application, allows a user of the DFEs of other printing devices to interact with content or software running on DFE 106.

Figure 2:
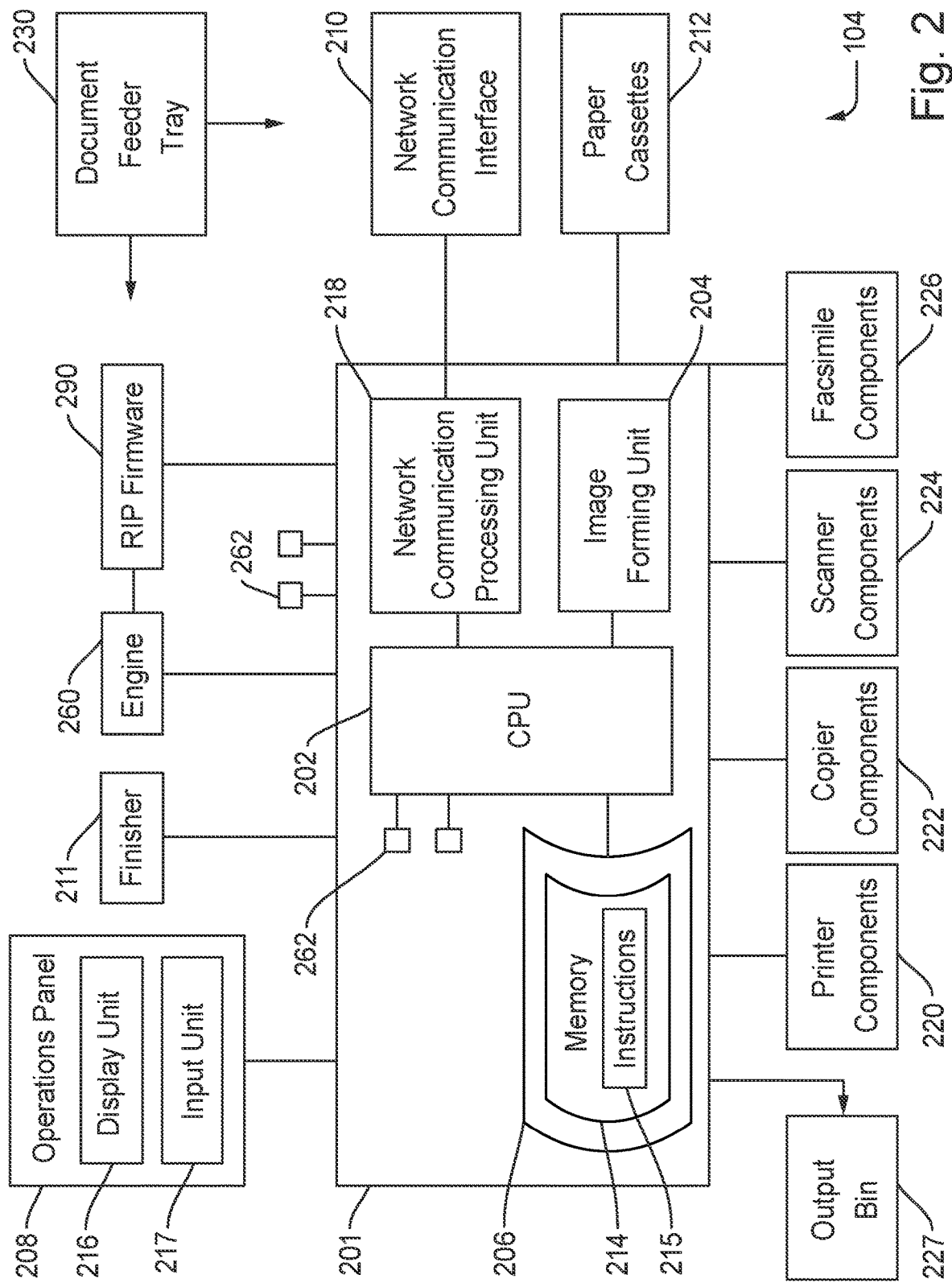
FIG. 2 illustrates a block diagram of components of the printing device for use within the printing system according to the disclosed embodiments.

FIG. 2 depicts a block diagram of components of printing device 104 according to the disclosed embodiments. The architecture shown in FIG. 2 may apply to any multi-functional printing device or image forming apparatus that performs various functions, such as printing, scanning, storing, copying, and the like within system 100. As disclosed above, printing device 104 may send and receive data from estimation system 108, if a separate device, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays. Paper cassettes 212 may include papers having various sizes, colors, composition, and the like. Papers or media within paper cassettes 212 may be considered "loaded" onto printing device 104. The information for printing these papers may be captured in a paper catalog stored at DFE 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Display unit 216 also may serve as to display results from offline estimation device 108, if applicable. Estimation system 108 may send ink use estimation data to printing device 104 for display. For example, the operator at printing device 104 may request an estimate for a received print job 103. Printing device 104 requests an estimate for consumables 132 according to the disclosed embodiments.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104. RIP firmware 290 may be located in DFE 106, as disclosed above.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from estimation system 108 as well as other printing devices within system 100.

Figure 3:
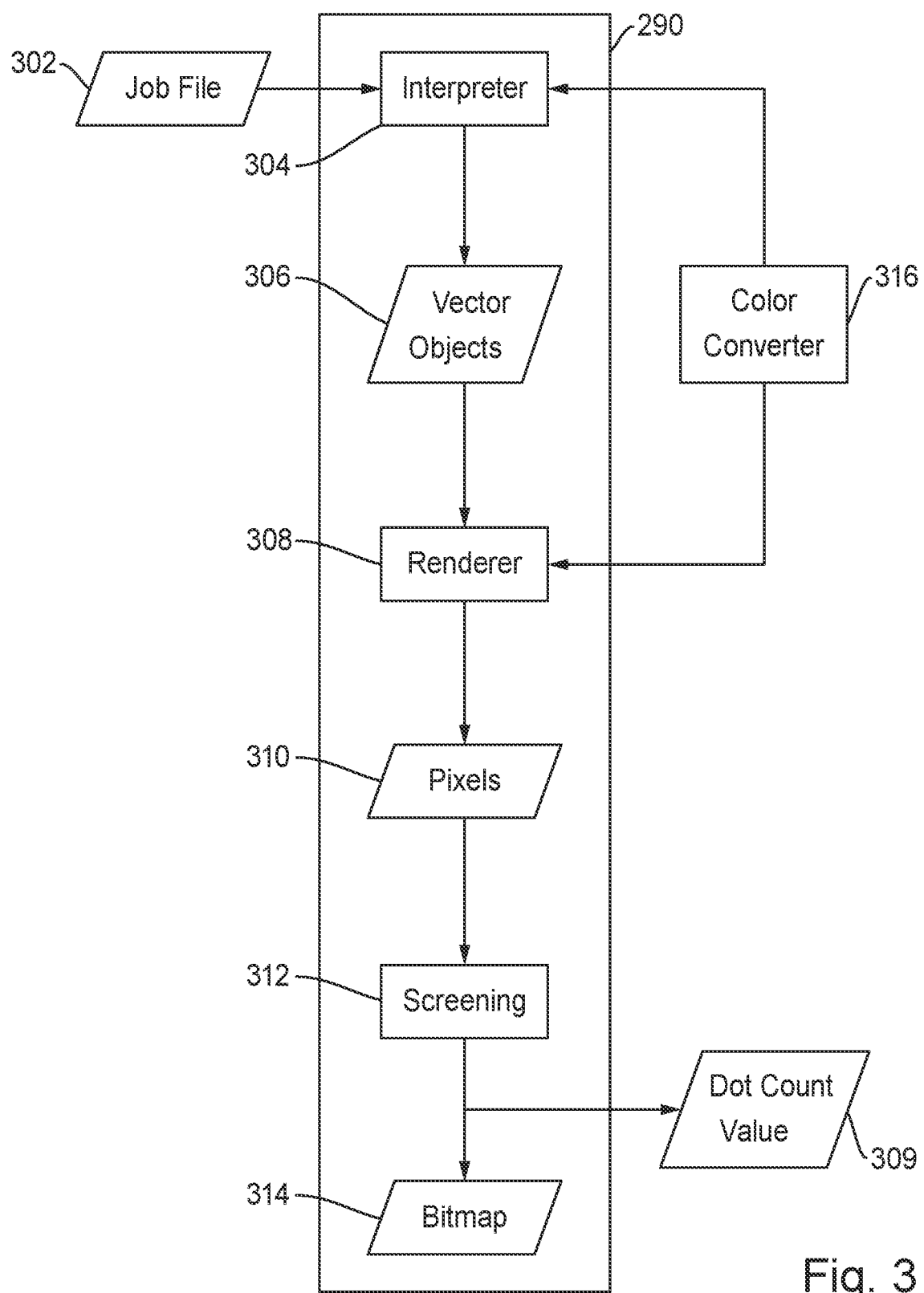
FIG. 3 illustrates a block diagram of RIP firmware used within the DFE according to the disclosed embodiments.

FIG. 3 depicts a block diagram of RIP firmware 290 used within DFE 106 according to the disclosed embodiments. RIP firmware 290 converts text and image data from different file formats including PDF, TIFF, or JPEG into a format that printing device 104 can understand. The process of raster image processing a page implements several steps to be performed, regardless whether the page is submitted as PostScript, PDF, or any other page description language (PDL). In short, RIP firmware 290 may provide interpretation, rasterization, and screening.

Job file 302 may be a job file associated with print job 103. Job file 302 may be a PostScript file in code. Job file 302 may be provided to RIP firmware 290 in DFE 106 to convert its code into raster or bitmap code. Job file 302 is received at interpreter 304, which interprets the commands in the code to redraw the object and elements of a page as vector objects 306. The PDL of job file 302 is read and decoded into graphical elements to be placed on a sheet. Each element may be an image, a character of text, a fill, stroke, and the like or listed in vector objects 306.

Renderer 308 processes vector objects 306 to convert every graphical element into the appropriate pattern of pixels to form the output raster. The resolution independent vector objects are converted into pixels 310. Screening 312 takes the raster image of pixels 310 to form individually screened cyan, magenta, yellow, and black separations. These are halftone dots in the form of a bitmap 314 consisting of commands that can be understood by print engine 260.

RIP firmware 290 also may implement color converter 316. Color converter 316 may implement the functions disclosed above with regard to color conversion. Color converter 316 provides color management and calibration. These actions may be applied during interpretation or rendering, depending on configuration and job content. Color printing resources may be accessed to provide the color management.

RIP firmware 290 may have a software version or other identification associated with it that distinguishes this version from others in system 100. Printing device 104 may implement several different RIP firmware versions depending on the type of print job 103. Further, different printing devices may implement different versions of the RIP firmware. Preferably, RIP firmware 290 is software implemented.

The disclosed embodiments also may determine dot count value 309 from the rendered image provided by renderer 308. Dot count values may be adjusted based on screening 312 and based on settings at printing device 104. Dot count value 309 may be reported to estimation system 108, as disclosed below.

The rendered document, or bitmap 314, may be sent to print engine 260. Estimation system 108 may apply a formula to dot count value 309 along with applicable settings to determine consumable use. Further, the disclosed embodiments may use this information to use a single consumable use estimate with a variety of job settings 126, DFE configuration settings 128, or printing device configuration settings 130. Dot count value 309 should not change once determined from the rendered document from RIP firmware 290. Engine specific settings, such as halftones, however, will impact consumable use at print engine 260, and may differ over time at printing device 104 or at another printing device within system 100.

Figure 4:
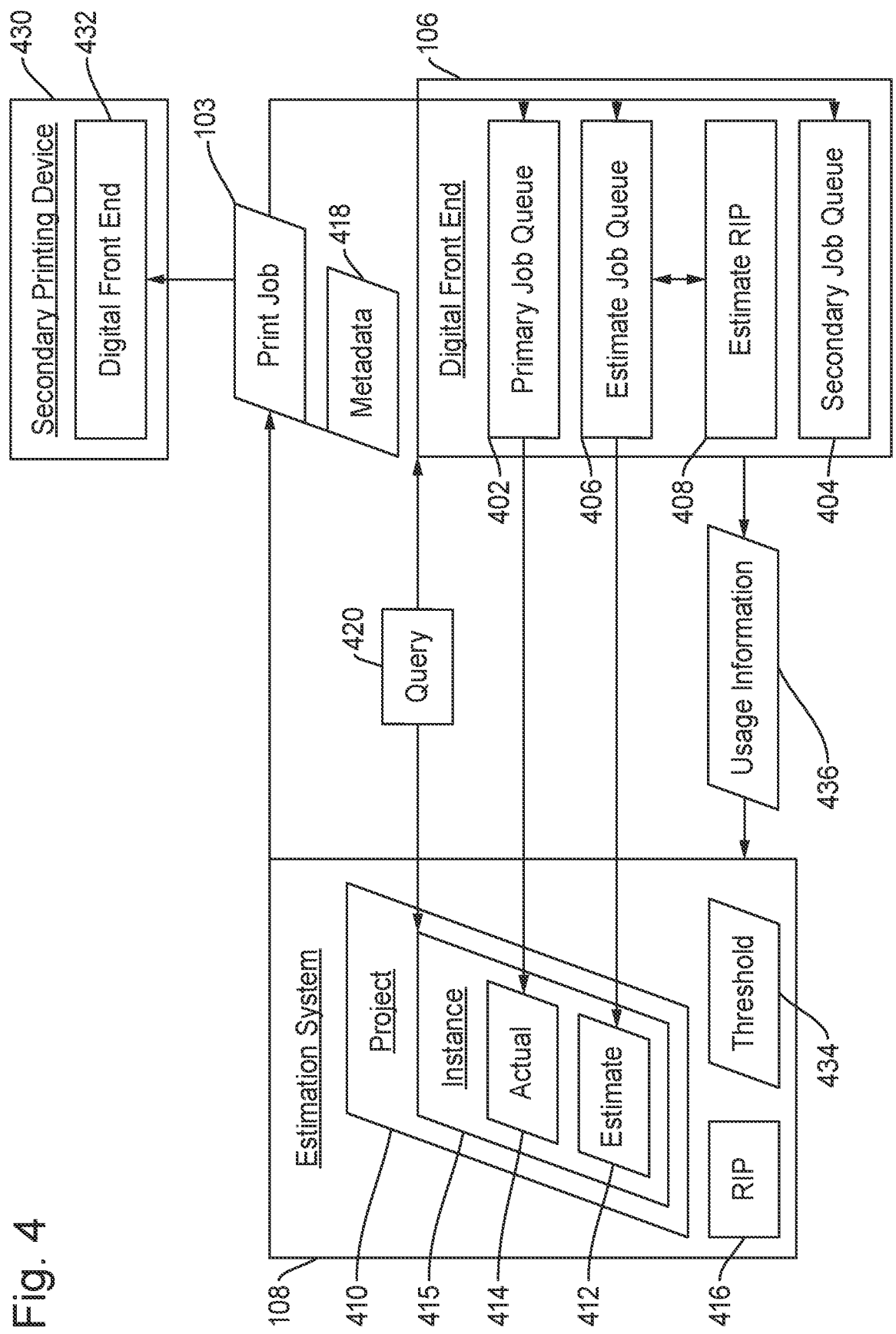
FIG. 4 illustrates a block diagram of hybrid consumable use estimation in the printing system according to the disclosed embodiments.

FIG. 4 depicts a block diagram of hybrid consumable use estimation in printing system 100 according to the disclosed embodiments. FIG. 4 further discloses the embodiments of estimation system 108 and DFE 106 in implementing hybrid ink estimation. In addition to the components disclosed above, DFE 106 includes one or more job queues to process print jobs for printing at printing device 104. Further, DFE 106 includes estimate job queue 406 to process print jobs for consumable use estimates.

For example, DFE 106 may include primary job queue 402 and secondary job queue 404. These job queues process print jobs as normal, according to instructions implemented by DFE 106. They also may work with multiple RIPs of RIP firmware 290 to process the print jobs to be sent to print engine 260 for printing, as disclosed above. Print jobs, however, submitted to DFE 106 for consumable use estimation are processed in a separate estimate job queue 406, that differs from primary job queue 402 and secondary job queue 404.

Estimate job queue 406 may receive print job 103 for calculating consumable use estimation from estimation system 108, which acts as a server component according to the disclosed embodiments. Estimate job queue 406 processes print job 103 serially using a single RIP instance, or estimate RIP 408. Estimate job queue 406 does not implement parallel processing with multiple RIPs such as primary job queue 402 and secondary job queue 404. Estimate RIP 408 may be configured to utilize less resources within DFE 106 than standard RIPs of RIP firmware 290.

Using estimate RIP 408, estimate job queue 406 only rasterizes print job 103 to obtain the data and information used to provide the consumable use estimation. For example, this information may include dot count value 309. After the rasterization process is complete, print job 103 is deleted from estimate job queue 406. Estimate job queue 406 does not generate print data or send such data to print engine 260. These features allow estimate job queue 406 to minimize impact on the rest of DFE 106 and, in turn, printing device 104 in providing consumable use estimates. Further, print jobs submitted to estimate job queue 406 have a lower priority when compared to print jobs submitted to primary job queue 402 or secondary job queue 404. Print jobs in estimate job queue 406 will pause raster image processing if other print jobs are submitted to DFE 106 for queues 402 and 404.

After consumable use estimation operations are complete at DFE 106, consumable use estimate 412 is provided to estimation system 108. In providing estimate 412, DFE 106 may take into account job settings 126, DFE configuration settings 128, and printing device configuration settings 130. DFE 106 also may retrieve project names from estimation system 108 to associate print job 103 with an existing project, such as a recurring printing operation. Print job 103 may be one of a series of print jobs sent to printing device 104.

For example, DFE 106 receives print job 103. Metadata 418 may indicate that print job 103 is associated with a project 410 for recurring printing operations stored at estimation system 108. DFE 106 analyzes metadata 418 and sends query 420 to estimation system 108 to determine whether a project already exists at the estimation system corresponding to print job 103. If so, then DFE 106 retrieves the project name from estimation system 108 in order to track through the estimation process and return estimate 412 to the correct project. DFE 106 also will retrieve existing values from estimation system 108. These values may be presented to the users who will either select one of those projects or specify a new project. If no project exists for print job 103, then DFE 106 may request that estimation system 108 create one.

For example, DFE 106 receives print job 103 with metadata 418 with a request for consumable use estimation. Print job 103 may include a job setting that invokes the estimation process at DFE 106. Estimation system 108 may send print job 103 upon receipt within system 100. Using information provided by metadata 418, DFE 106 sends query 420 to estimation system 108 for a project associated with print job 103. Print job 103 may be part of a recurring printing operation that sends multiple print job instances to printing device 104. Estimation system 108 determines that project 410 corresponds to print job 103 and provides this information to DFE 106 to complete query 420.

After generating estimate 412 based on print job 103, DFE 106 forwards the estimate to estimation system 108. Estimation system 108 stores estimate 412 with project 410. Estimation system 108 then may release print job 103 to be printed by printing device 104. Thus, print job 103 is provided to primary job queue 402 to actually be processed for printing. In primary job queue 402, print job 103 will have priority over print jobs submitted for estimates in estimate job queue 406. After printing is completed, DFE 106 may determine the actual consumable use data for print job 103. This data is provided to estimation system 108 as actual consumable use 414. Estimation system 108 also stores actual consumable use 414 with project 410. Thus, DFE 106 returns consumable use data to estimation system 108 for monitoring and tracking. This feature may eliminate usability issues related to estimating consumable use for print jobs that are automatically submitted from upstream systems to DFE 106.

With regard to estimation system 108, the disclosed embodiments allow any operator or user to submit print jobs for consumable use estimation. When a print job 103 is submitted, estimation system 108 send the print job to DFE 106 for estimation, as disclosed above. Once the print job is completed, estimation system 108 receives consumable use information from DFE 106. This information, shown as actual consumable use 414, may be tracked and also returned to the operators or users. Estimation system 108 also allows operators and users to create estimation projects, such as project 410, that will be used for initial estimations and for monitoring actual costs from print runs.

For example, after several print runs of print job 103, project 410 may include estimate 412 and actual consumable use 414 for each instance 415 that a print job was completed. One may review this information to determine if there is a significant deviation between estimated consumable use and actual consumable use. If so, then the operator may take corrective action or modify the settings used for estimation. This information also may show what the actual costs are to implement project 410.

Estimation system 108 also includes RIPs 124. From RIPs 124, estimation system 108 may implement a full RIP 416 to perform complete consumable use estimation. Based on information from DFE 106, estimation system 108 may select RIP 416 from the plurality of RIPs 124. RIP 416, however, preferably is used conditionally. When consumable use calculation is initiated within estimation system 108, print job 103 is nominally sent to DFE 106 as disclosed above.

Estimation system 108, however, may pull back print job 103 and perform the consumable use estimation locally based on criteria at DFE 106 of printing device 104. Alternatively, estimation system 108 may forgo sending print job 103 to DFE 106 if the conditions are met. Such conditions include if printing device 104 uses an embedded controller for DFE 106. An embedded controller may have limited performance in that it cannot provide estimations in a timely manner or without significant commitment of resources.

Another condition may be if DFE 106 has a backlog of print jobs that need to be processed. This backlog may exceed a configured threshold 434. DFE 106 may provide usage information 436 that corresponds to a backlog condition within DFE 106 to estimation system 108. Usage information 436 may include the number of print jobs in primary job queue 402, secondary job queue 404, or estimate job queue 406. Alternatively, it may correspond to an estimated print time for the print jobs in one or more of the queues. Estimation system 108 may compare usage information 436 to threshold 434 to determine whether a backlog condition exists. In other embodiments, DFE 106 may send usage information 436 that printing device 104 is busy, which is not related to a backlog condition.

If a backlog condition exists, then estimation system 108 may perform estimation operations locally using RIP 416. Estimation operations at estimation system 108 may be performed as disclosed in FIG. 1A using estimation logic 118. Estimation system 108 then may submit print job 103 to DFE 106 for printing operations to receive actual consumable use 414.

In some embodiments, if printing system 100 includes multiple printing devices, then estimation system 108 may elect to send print jobs for consumable use estimation to a printing device other than the printing device that the operator or the user selected. Thus, estimation system 108 may be connected to secondary printing device 430, which includes DFE 432. DFE 432 may include the components and features disclosed for DFE 106. If problems exist at DFE 106, then estimation system 108 may submit print job to DFE 432 to generate consumable use estimate 412.

Estimation system 108 also may compare the configuration for printing device 104 to the configuration for secondary printing device 432. If there is a difference in the configuration between the printing devices, then estimation system 108 may elect to do the processing locally, as disclosed above, to obtain consumable use estimate 412. Alternatively, instead of requesting consumable use estimation, estimation system 108 may request that DFE 432 only perform rendering to obtain dot count value 309 that may be taken and adjusted to determine consumable use for the selected printing device.

Figure 5:
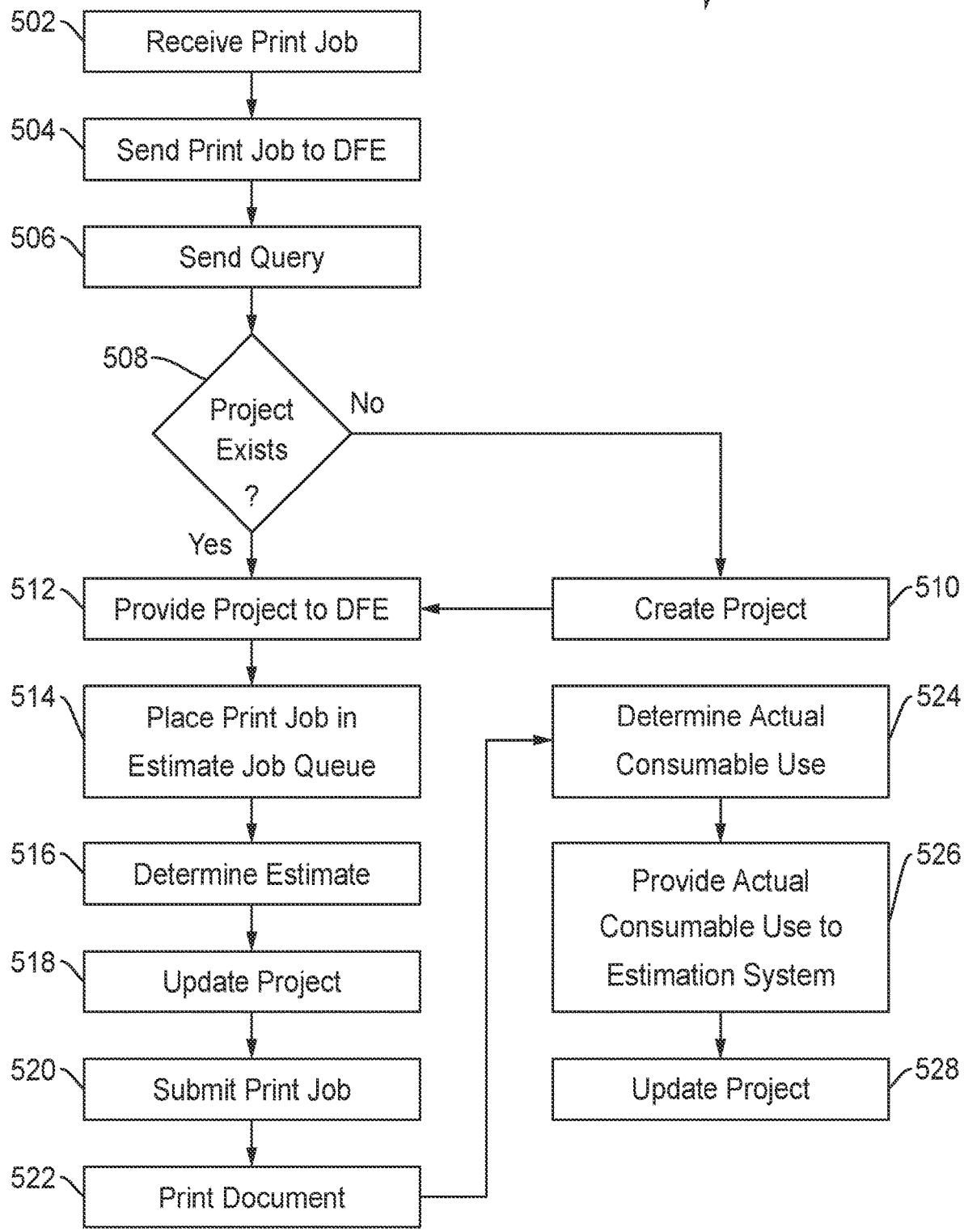
FIG. 5 illustrates a flowchart for implementing hybrid consumable use estimation according to the disclosed embodiments.

FIG. 5 depicts flowchart 500 for implementing hybrid consumable use estimation according to the disclosed embodiments. Flowchart 500 may refer to FIGS. 1A-4 for illustrative purposes. Flowchart 500, however, is not limited by the embodiments disclosed by FIGS. 1A-4.

Step 502 executes by receiving print job 103 at estimation system 108. Alternatively, print job 103 may be received at printing device 104 but then referred to estimation system 108. Step 504 executes by sending print job 103 to DFE 106 of printing device 104. Step 506 executes by sending query 420 from DFE 106 to estimation system 108. Print job 103 may include metadata 418 that indicates a project associated with the print job. For example, print job 103 may be part of a project having recurring printing operations.

Step 508 executes by determining whether query 420 identifies an existing project for printing operations at estimation system 108. If no, then a project does not exist yet for print job 103. Thus, step 510 executes by creating project 410 at estimation system 108 for print job 103. DFE 106 may instruct estimation system 108 on the information needed to open the project. If step 508 is yes, then project 410 exists at estimation system 108 that corresponds to metadata 418 for print job 103. Print job 103 is associated with project 410. Thus, step 512 executes by providing information for project 410 to DFB 106. DFE 106 may use this information in tracking the estimation operations for print job 103 and as a reference data for the resulting estimate.

Step 514 executes by placing print job 103 in estimate job queue 406. Estimate job queue 406 may be used in providing consumable use estimates for print jobs in DFE 106. Thus, consumable use estimates do not tie up primary job queue 402 or secondary job queue 404. Step 516 executes by determining consumable use estimate 412 for print job 103. DFE 106 may use estimate job queue 406 and estimate RIP 408 to obtain information needed to generate consumable use estimate 412.

Step 518 executes by updating project 410 with consumable use estimate 412. DFE 106 provides consumable use estimate 412 to estimation system 108 to be stored with project 410 associated with print job 103. Step 520 executes by submitting print job 103 to DFE 106 for actual printing operations. In some embodiments, estimation system 108 may send an instruction to DFE 106 to print document 105 for print job 103 without actually resubmitting the data for the print job. Step 522 executes by printing document 105 at printing device 104. Print job 103 may be placed in primary job queue 402 or secondary job queue 404 for processing and printing out.

Step 524 executes by determining actual consumable use 414 for printing document 105 of print job 103. Actual consumable use 414 may differ from consumable use estimate 412 determined above. Step 526 executes by providing actual consumable use 414 to estimation system 108 from DFE 106. Step 528 executes by updating project 410 with the information from actual consumable use 414.

FIG. 6 illustrates a flowchart 600 for determining whether to estimate consumable use at estimation system 108 according to the disclosed embodiments. Flowchart 600 may refer to FIGS. 1A-5 for illustrative purposes. Flowchart 600, however, is not limited to the embodiments disclosed by FIGS. 1A-6.

Step 602 executes by requesting usage information 436 for DFE 106 by estimation system 108. Estimation system 108 may receive print job 103 and needs to determine whether to send it to DFB 106 for estimating consumable use. DFE 106 compiles usage information 436 based on workload, the number of print jobs in job queues, the expected time to complete pending print jobs, and the like. Step 604 executes by analyzing usage information 436 to determine of the status of DFB 106 meets a condition. For example, usage information 436 may be compared to threshold 434 to determine whether a backlog condition exists at DFE 106. Alternatively, usage information 434 may indicate that DFE 106 is an embedded controller and, therefore, not particularly suitable for consumable use estimation operations. DFE 106 may use usage information 434 to indicate that printing device 104 is busy at this time.

Step 606 executes by determining whether the condition is met to perform estimation operations at estimation system 108. If no, then step 608 executes by proceeding with determining consumable use estimate 412 as disclosed in FIG. 5. If step 606 is yes, then step 610 executes by selecting RIP 416 from plurality of RIPs 124 at estimation system 108. Preferably, settings are received from DFE 106 that will allow estimation system 108 to select the RIP that best corresponds to RIP firmware 290 or estimate RIP 408 implemented by the DFE. Step 612 executes by determining consumable use estimate 412 using RIP 416 at estimation system 108 using estimation logic 118. Flowchart 600 then may executes steps 518-528, as disclosed above.

FIG. 7 illustrates a flowchart 700 for determining whether to estimate consumable use at a secondary printing device according to the disclosed embodiments. Flowchart 700 may refer to FIGS. 1A-6 for illustrative purposes. Flowchart 700, however, is not limited to the embodiments disclosed by FIGS. 1A-6. Flowchart 700 may apply in situations where estimation system 108 is connected to multiple printing devices, such as printing device 104 and secondary printing device 430 disclosed in FIG. 4. As disclosed below, the first printing device may refer to printing device 104 and the first DFE may refer to DFB 106. The second printing device may refer to secondary printing device 430 and the second DFE may refer to DFE 432.

Step 702 executes by determining a first DFE cannot provide the consumable use estimate for print job 103. This process may be done according to steps 602-608 disclosed in flowchart 600. It may be determined that a condition exists that does not allow DFB 106 of printing device 104 to perform consumable use estimation operations. Step 704 executes by selecting a second printing device within system 100 by estimation system 108. Estimation system 108 may select secondary printing device 430 based on its similarity to printing device 104. For example, the printing devices may be the same make and model. Other criteria also may be implemented to select secondary printing device 430, such as location compared to printing device 104.

Step 706 executes by obtaining configuration information from secondary printing device 430. Make and model information may be provided as well as DFE configuration settings and printing device configuration settings. The configuration of secondary printing device 430 may influence the amount of ink, toner, and the like. For example, secondary printing device 430 may purge its inkjets according to a preset setting. This preset setting may differ from the one for printing device 104. The configuration information is provided to estimation system 108.

Step 708 executes by determining whether a difference exists between the configuration available for secondary printing device 430 and the configuration available for printing device 104. As noted above, differences may exist between the settings of the printing devices or between the make and model of each. The operator may define how much difference must occur in order for step 708 to be "yes." For example, a policy available at estimation system 108 may define that if 10% of the settings differ between the printing devices, then step 708 is "yes." In another example, if a single critical difference exists, then step 708 is "yes." An example critical difference may be whether color printing operations are available at both printing devices.

If step 708 is no, then step 710 executes by determining consumable use estimate 412 for print job 103 at secondary printing device 430 using DFE 432. Secondary printing device 430 and DFE 432 may implement the features for estimating consumable use performed by printing device 104 and DFE 106 disclosed above. Step 712 executes by returning consumable use estimate 412 to estimation system 108.

If step 708 is yes, then one or more differences exist between printing device 104 and secondary printing device 430 such that secondary printing device 430 should not perform the full consumable use estimation needed by estimation system 108. Step 714 then executes by determining whether estimation system 108 will perform the estimation operations locally as opposed to seeking another printing device. If yes, then step 716 executes by performing the estimation operations for print job 103 at estimation system 108. This process may be disclosed by steps 610 and 612 of flowchart 600.

If step 714 is no, then estimation system 108 will not perform estimation operations. Step 718 executes by having DFE 432 of secondary printing device 430 only perform rendering of print job 103 by the respective estimate RIP. In performing rendering operations, dot count value 309 may be determined for print job 103. Step 720 executes by forwarding dot count value 309 from DFE 432 to estimation system 108, which can use this information and adjust it to determine consumable use estimate 412.

Thus, the disclosed embodiments enable a hybrid consumable use estimation implementation that uses estimation system 108 along with DFE 106 or 432 to provide accurate estimates without unduly using resources better used for production printing operations. These features minimize impact to production printing using the printing devices. It also makes consumable use estimation available to customer service or other people outside the print shop by going through estimation system 108 as a server component. The disclosed embodiments also provide long term monitoring for recurring print jobs.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for hybrid consumable use estimation, the method comprising:
   receiving a print job at a server for a consumable use estimation;
   sending the print job to a digital front end (DFE) of a printing device;
   determining a consumable use estimate for the print job at the DFE using the settings of the printing device, wherein the DFE implements a separate queue to provide the estimated consumable use for the print job;
   returning the consumable use estimate for the print job to the server;
   associating the print job with stored consumable use estimates for a recurring project stored at the server; and
   updating the stored consumable use estimates for the recurring project with the consumable use estimate.

2. The method of claim 1, further comprising enabling the consumable use estimation as a job setting for the print job.

3. The method of claim 1, further comprising determining an actual consumable use for the print job.

4. The method of claim 3, further comprising providing the actual consumable use for the print job to the server.

5. The method of claim 1, further comprising creating a project at the server for the consumable use estimate.

6. The method of claim 1, wherein the print job is submitted to the separate queue and processed serially using a single raster image processor instance.

7. A method for hybrid consumable use estimation, the method comprising:
   receiving a print job at a server for a consumable use estimation;
   sending the print job to a digital front end (DFE) of a printing device to obtain a consumable use estimate;
   determining that the DFE cannot provide the consumable use estimate; and
   determining the consumable use estimate using a raster image processor (RIP) at the server, wherein the DFE provides settings for the printing device to the server.

8. The method of claim 7, wherein determining that the DFE cannot provide the consumable use estimate includes determining that the DFE uses an embedded controller.

9. The method of claim 7, wherein determining that the DFE cannot provide the consumable use estimate includes determining a backlog condition exists at the DFE.

10. The method of claim 9, wherein the backlog condition relates an estimated print time for the print job.

11. The method of claim 7, wherein determining that the DFE cannot provide the consumable use estimate includes determining that the printing device is busy.

12. The method of claim 7, further comprising associating the print job with stored consumable use estimates for a recurring project stored at the server.

13. The method of claim 12, further comprising updating the stored consumable use estimates for the recurring project with the consumable use estimate.

14. A method for hybrid consumable use estimation, the method comprising:
   receiving a print job at a server for a consumable use estimation;
   sending the print job to a first digital front end (DFE) of a first printing device to obtain a consumable use estimate;
   determining that the first DFE cannot provide the consumable use estimate;
   sending the print job to a second DFE of a second printing device to obtain the consumable use estimate;
   determining the consumable use estimate for the print job at the second DFE of the second printing device; and
   returning the consumable use estimate for the print job to the server.

15. The method of claim 14, wherein the second DFE implements a separate queue to provide the estimated consumable use for the print job.

16. The method of claim 14, wherein determining that the first DFE cannot provide the consumable use estimate includes determining that the first DFE uses an embedded controller.

17. The method of claim 14, wherein determining that the first DFE cannot provide the consumable use estimate includes determining a backlog condition exists at the first DFE.

18. A method for hybrid consumable use estimation, the method comprising:
   receiving a print job at a server for a consumable use estimation;
   sending the print job to a digital front end (DFE) of a printing device;
   determining a consumable use estimate for the print job at the DFE using the settings of the printing device, wherein the DFE configures a raster image processor (RIP) instance based on a print ticket setting;
   returning the consumable use estimate for the print job to the server;
   associating the print job with stored consumable use estimates for a recurring project stored at the server; and updating the stored consumable use estimates for the recurring project with the consumable use estimate.

\* \* \* \* \*